United States Patent [19]

Ellis et al.

[11] 3,880,880

[45] Apr. 29, 1975

[54] SUBSTITUTED 2-AZETIDINESULFENIC ACID

[75] Inventors: Alvin I. Ellis; Stjepan P. Kukolja, both of Indianapolis; Steven R. Lammert, Greenwood, all of Ind.

[73] Assignee: Eli Lilly and Company, Indianapolis, Ind.

[22] Filed: Aug. 3, 1973

[21] Appl. No.: 385,368

[52] U.S. Cl. .................................... 260/326 S
[51] Int. Cl.² ...................................... C07D 27/00
[58] Field of Search ............................ 260/326 S

[56] References Cited
UNITED STATES PATENTS

| | | | |
|---|---|---|---|
| 3,433,784 | 3/1969 | Long et al. ...................... | 260/326 S |
| 3,840,556 | 10/1974 | Kukolja ........................... | 260/326 S |
| 3,843,682 | 10/1974 | Kukolja ........................... | 260/326 S |

OTHER PUBLICATIONS

Journal of the American Chemical Soc., 92:8 Apr. 22, 1970, pp. 2575–2576, relied on.

*Primary Examiner*—Elbert L. Roberts
*Attorney, Agent, or Firm*—William C. Martens, Jr.; Everet F. Smith

[57] ABSTRACT

3R-Phthalimido-1-(1'S-p-nitrobenzyloxycarbonyl-2'-methylprop-2'-enyl)-4-oxo-2-azetidinesulfenic acid is prepared by scission of the S-$C_2$ bond of p-nitrobenzyl 6-phthalimido-2,2-dimethylpenam-3-carboxylate-1-oxide. The sulfenic acid can be converted to desacetoxycephalosporin.

4 Claims, No Drawings

SUBSTITUTED 2-AZETIDINESULFENIC ACID

BACKGROUND OF THE INVENTION

The cephalosporin antibiotics have recently achieved considerable success as therapeutic agents for the treatment of infectious diseases of man.

One of the methods by which the cephalosporin antibiotics are produced involves the chemical conversion of a penicillin. This method was invented by Morin and Jackson (U.S. Pat. No. 3,275,626) who describe and claim a process for converting a penicillin sulfoxide ester to a desacetoxycephalosporin ester. Subsequently, improvements were made upon this Morin-Jackson process. Robin D. G. Cooper found that the use of certain tertiary carboxamide solvents (British Pat. No. 1,204,972) or certain tertiary sulfonamide solvents (British Pat. No. 1,204,394) directed the heat re-arrangement of the penicillin sulfoxide esters more specifically toward production of the corresponding desacetoxycephalosporin esters and permitted the use of lower temperatures. Hatfield (U.S. Pat. No. 3,591,585) improved upon the Cooper contributions by finding that the conversion of a penicillin sulfoxide ester to a desacetoxycephalosporin ester by heating under acid conditions in the presence of a tertiary carboxamide solvent can be further improved by carrying out the reaction in the presence of both a sulfonic acid and a means for removing or inactivating water present in the reaction mixture.

The mechanism which is postulated in U.S. Pat. No. 3,275,626 for the conversion of the penicillin sulfoxide ester to a desacetoxycephalosporin ester is by formation of a sulfenic acid involving scission of the S-$C_2$ bond. This mechanism has now been conclusively established, and it furthermore has been shown (R. D. G. Cooper, J.A.C.S., 92, [1970] pp. 5,010–5011) that, under the conditions of reaction, a thermal equilibrium between the sulfoxide starting material and the sulfenic acid intermediate is established.

The sulfenic acid has been postulated as a fleeting and unstable intermediate. Upon formation from the penicillin sulfoxide starting material, it reverts to the original penicillin sulfoxide, or it is directed to the desired desacetoxycephalosporin. It was never isolated intact from the ring expansion reaction mixture, and no way was recognized by which it could be isolated. It was believed to be a fleeting and unstable reaction intermediate only.

Recently, it has been discovered that it is possible to trap the sulfenic acid intermediate during ring expansion of the penicillin sulfoxide by conversion of the sulfenic acid to its corresponding silyl ester (T. S. Chou, United States Application No. 349,876 filed Apr. 12, 1973, and continuation-in-part of United States Application No. 252,078 filed May 10, 1972). This is achieved by heating the penicillin sulfoxide in the presence of a silylating agent which reacts with the sulfenic acid intermediate to produce a stable silyl ester azetidine-2-sulfenate. The stable silyl ester, upon treatment with acid, is then ring closed to the desired desacetoxycephalosporin compound.

It has now been discovered that a sulfenic acid, previously considered fleeting and unstable, can indeed be isolated intact. It is to such a sulfenic acid and to a process for its preparation that this invention is directed.

SUMMARY OF THE INVENTION

This invention is directed to the compound, 3R-phthalimido-1-(1′S-p-nitrobenzyloxycarbonyl-2′-methylprop-2′-enyl)-4-oxo-2-azetidinesulfenic acid. This compound has the structure

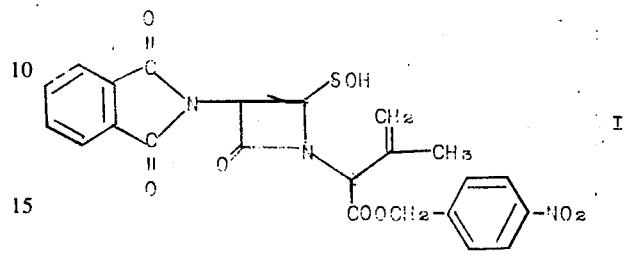

This invention also relates to a process for preparing the compound of formula I. This process comprises heating p-nitrobenzyl 6-phthalimido-2,2-dimethylpenam-1-oxide-3-carboxylate in an inert solvent at a temperature of from about 60°C. to about 150°C. for a period of from about 5 minutes to about 60 minutes, and recovering the thereby-produced 2-azetidinesulfenic acid.

DETAILED DESCRIPTION OF THE INVENTION

The compound of this invention is prepared from the corresponding p-nitrobenzyl ester of 6-phthalimidopenicillin sulfoxide (p-nitrobenzyl 6-phthalimido-2,2-dimethylpenam-3-carboxylate-1-oxide). The p-nitrobenzyl ester is heated in an inert solvent at a temperature of from about 60°C. to about 150°C. for a time sufficient to achieve scission of the S-$C_2$ bond. Generally, this will be from about 5 minutes to about 60 minutes, with the time of reaction being dependent upon the particular temperature which is employed. An increase in the temperature of reaction generally will decrease the necessary reaction time. Preferably the time of reaction is from about 10 to about 20 minutes.

It has been discovered that the free sulfenic acid intermediate generated by heating the p-nitrobenzyl 6-phthalimidopenicillin sulfoxide can be readily isolated from the reaction mixture if the product is recovered prior to exposure to an acidic medium which would achieve ringclosure of the sulfenic acid either back to the penicillin sulfoxide or to the desacetoxycephalosporin.

Any suitable inert solvent can be employed. Suitable solvents are those having a boiling point at least as high as the temperature of reaction and include, for example, aromatic hydrocarbons such as benzene, toluene, and the like; halogenated hydrocarbons such as carbon tetrachloride, chlorobenzene, bromoform, bromobenzene, 1,2-dichloroethane, 1,2-dibromoethane, and the like; esters, such as ethyl acetate, butyl acetate, and the like; ketones, such as methyl ethyl ketone, and the like; and any other appropriate inert solvents. Preferred solvents are those having a boiling point within the temperature range at which the reaction is to be carried out, thereby permitting the reaction mixture to be refluxed while retaining temperature control.

Upon heat treatment of the p-nitrobenzyl 6-phthalimidopenicillin sulfoxide to achieve scission of the S-$C_2$ bond, the resulting reaction mixture generally will contain a mixture of the sulfenic acid product and the sulfoxide starting material. Isolation of the sulfenic acid product can be accomplished by conventional techniques, and, preferably, by fractional recrystallization. For example, the sulfenic acid product can be isolated from the reaction mixture containing unreacted sulfoxide by evaporating the solvent from the reaction mixture, recrystallizing the residue from a mixture of ethyl acetate and ethyl ether to separate a major portion of the unreacted sulfoxide, evaporating the recrystallization filtrate to dryness, and recrystallizing the residue from a mixture of methylene chloride and cyclohexane to obtain pure sulfenic acid product.

As already noted, subjection of the sulfenic acid to an acidic medium accomplishes ring-closure of the sulfenic acid. The ring-closed product is the p-nitrobenzyl ester of 7-phthalimido-3-methyl-3-cephem-4-carboxylic acid, in greater or lesser amount depending upon the conditions which are employed. Any of the acids mentioned in the Morin and Jackson U.S. Pat. No. 3,275,626 can be employed. Preferably, a sulfonic acid is employed, and, most preferably, methanesulfonic acid.

The thus-produced p-nitrobenzyl 7-phthalimido-3-methyl-3-cephem-4-carboxylate can be readily converted to an antibiotically active cephalosporin.

In accordance with a recently discovered process, the phthalimido function can be removed by the sequence which includes alkaline hydrolysis to achieve partial cleavage to the phthalamic acid side chain. This can be effected by a method such as that described in Sheehan et al., Journal of the America Chemical Society, 73, (1951), pp. 4,367–4,372.

The resulting phthalamic acid derivative is then dehydrated to the corresponding phthalisoimide compound. The phthalisoimide structure can be obtained by treatment of the phthalamic acid with a dehydrating agent, for example, N,N'-dicyclohexylcarbodiimide. The dehydration is accomplished by treating the phthalamic acid with an equivalent amount of the dehydrating agent in an inert medium at a temperature of from about 0° to about 30°C. for from about 15 minutes to about 2 hours.

The resulting phthalisoimide is cleaved to the free 7-aminodesacetoxycephalosporin by reacting the phthalisoimide with hydrazine. The reaction is carried out using equivalent amounts of phthalisoimide and the hydrazine. The mixture is reacted in an inert organic solvent at a temperature of from about −76°C. to about room temperature for from about 1 to about 10 minutes. A complex thereby forms which is decomposed by heating the reaction mixture to a temperature of from about 50° to about 100°C. or by addition to the reaction mixture of an acid. When heat is employed the free 7-aminocephalosporin is recovered as such, and when acid is employed, the 7-aminocephalosporin is recovered in the form of its corresponding acid addition salt.

The 7-aminocephalosporin can be acylated with any of several recognized side chains in accordance with conventional methods to produce a cephalosporin containing a selected 7-acylamido function, for example, phenylglycylamido.

An antibiotically active cephalosporin is produced from the thus acylated cephalosporin by cleavage of the p-nitrobenzyl moiety at the 4-carboxyl group of the cephalosporin. Deesterification can be accomplished in accordance with recognized techniques including, for example, treatment of the p-nitrobenzyl ester with an acid such as trifluoroacetic acid, hydrochloric acid, and the like, or with zinc and acid, such as formic acid, acetic acid, or hydrochloric acid. It can likewise be accomplished by hydrogenating the ester in the presence of palladium, rhodium or a compound thereof, in suspension or on a carrier such as barium sulfate, carbon, alumina, or the like.

A particular antibiotic which is available from the above procedure is cephalexin, that is, 7-phenylglycylamido-3-methyl-3-cephem-4-carboxylic acid.

The following examples are provided to further illustrate this invention. It is not intended that this invention be limited in scope by reason of these examples.

EXAMPLE 1.

Preparation of 3R-phthalimido-1-(1'S-p-nitrobenzyloxycarbonyl-2'-methylprop-2'-enyl)-4-oxo-2-azetidinesulfenic acid.

A solution of p-nitrobenzyl 6-phthalimido-2,2-dimethylpenam-3-carboxylate-1-oxide (45.5 g.) in 50 ml. of ethyl acetate was refluxed for 10 min., and the solvent then was distilled off on a steam bath. The nmr spectrum of the colorless residue indicated that a mixture of the starting sulfoxide and the titled sulfenic acid was obtained in a 4:1 ratio. The mixture was recrystallized from ethyl acetate and ether (50/200 ml.), and 27.5 g. (60 percent) of the sulfoxide were obtained. The filtrate was evaporated to dryness, and the residue was recrystallized from methylene chloride and cyclohexane (200/100 ml.) to obtain 4.5 g. (10 percent) of the crystalline sulfenic acid, m.p. 152°–153°C., ir (KBr) 3160, 1779, 1720, 1760, 1740, 1179, 1154 and 770 cm$^{-1}$; the mass spectrum m/e 497, M$^+$; nmr (CDCL$_3$/DMSO d$_6$) 120 (s, C-CH$_3$) 305 and 311 (2 vinylic and H–3, J= 1.0 Hz), 338 and 350 (d, 2, cis azetidinone H, J=4.5 Hz), and 435 Hz (s, SOH, D$_2$O exchangeable).

Anal., Calcd. for C$_{23}$H$_{19}$H$_3$O$_8$S: C, 55.53; H, 3.85;
    N, 8.45; O, 25.73; S, 6.54%.
  Found:  C, 55.83; H, 3.86; N, 8.16; O, 25.55;
    and S, 6.50%.

EXAMPLE 2.

Preparation of p-nitrobenzyl 7-phthalimido-3-methyl-3-cephem-4-carboxylate.

To a refluxing solution of 6 ml. N-N-dimethylacetamide, 8 ml. benzene, and one drop of methanesulfonic acid were added 249 mg. (0.5 mmol.) of 3R-phthalimido-1-(1'S-p-nitrobenzyloxycarbonyl-2'-methylprop-2'-enyl)-4-oxo-2-azetidinesulfenic acid. The mixture was refluxed for 15 minutes using a Dean-Stark water trap. The mixture then was cooled and evaporated in vacuo to dryness. The crude product was purified by preparative tlc using a 2:1 mixture of benzene and ethyl acetate. p-Nitrobenzyl 7-phthalimido-3-methyl-3-cephem-4-carboxylate (78 mg., 32 percent) was isolated. The nmr spectrum was identical to that of an authentic sample prepared by esterification of 7-phthalimido-3-methyl-3-cephem-4-carboxylic acid.

We claim:
1. 3R-Phthalimido-1-(1'S-p-nitrobenzyloxycarbonyl-2'-methylprop-2'enyl)-4-oxo-2-azetidinesulfenic acid.

2. A process for preparing the compound of claim 1, which comprises heating p-nitrobenzyl 6-phthalimido-2,2-dimethylpenam-1-oxide-3-carboxylate in an inert solvent at a temperature of from about 60° to about 150°C. for a period of from about 5 minutes to about 60 minutes, and recovering the thereby-produced 2-azetidinesulfenic acid.

3. Process of claim 2, in which the 2-azetidinesulfenic acid is recovered by fractional recrystallization.

4. Process of claim 3, in which the 2-azetidinesulfenic acid is recovered by evaporating the inert solvent from the reaction mixture, recrystallizing the resulting residue from a mixture of ethyl acetate and ethyl ether, evaporating the resulting recrystallization filtrate to dryness, and recrystallizing the residue of said recrystallization filtrate from a mixture of methylene chloride and cyclohexane.

* * * * *